June 20, 1939.  S. F. STEWART  2,163,502

AUTOMATIC CUT-OUT DEVICE

Filed June 16, 1937

INVENTOR.
SEYMOUR FLOYD STEWART

Kwis Hudson & Kent
ATTORNEYS

Patented June 20, 1939

2,163,502

UNITED STATES PATENT OFFICE 2,163,502

AUTOMATIC CUT-OUT DEVICE

Seymour Floyd Stewart, Cleveland, Ohio, assignor to The Leece-Neville Company, Cleveland, Ohio, a corporation of Ohio Application June 16, 1937, Serial No. 148,483

1 Claim. (Cl. 171—314)

This invention relates to electric generating and distributing systems of the type including a variable speed generator and a storage battery and, more particularly, to novel automatic control means for connecting and disconnecting the battery and generator.

The conventional cut-out relay, as used in generating and battery charging systems, has a pair of main contacts in the charging circuit which are closed when the terminal voltage of the generator reaches a given value without regard to what the terminal voltage of the battery may be at the time. In my improved cut-out and system the closing of the main contacts of the relay is opposed or prevented until the terminal voltage of the generator has increased to a value above the terminal voltage of the battery.

An object of my invention is to provide an improved cut-out device, for use with a system of the type mentioned, which will operate efficiently to connect the battery in circuit with the generator when the terminal voltage of the generator is approximately equal to or exceeds the terminal voltage of the battery but will prevent such connection being established when the terminal voltage of the battery exceeds the voltage of the generator.

Another object of my invention is to provide an improved automatic cut-out, of the type referred to, having an auxiliary series winding and an additional pair of contacts controlling such winding whereby the additional series winding may be energized from the battery to oppose the closing of the main contacts of the cut-out when the terminal voltage of the battery exceeds that of the generator.

A further object of my invention is to provide an improved cut-out device, of the type mentioned, in which the contacts controlling the auxiliary series coil or winding are arranged to close in advance of the main contacts of the device.

Further objects and advantages of my invention will be apparent from the following description when taken in conjunction with the accompanying sheet of drawings, in which Fig. 1 is a wiring diagram showing my improved cut-out relay and a generating system embodying this relay;

Figure 3:
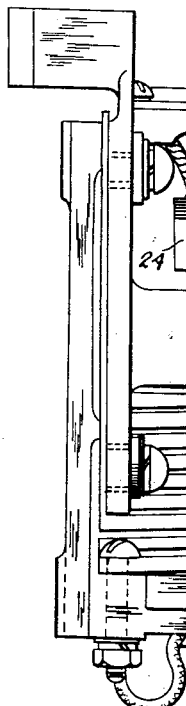
Fig. 3 is a side elevation thereof.

More detailed reference will now be made to the accompanying drawing in describing my novel cut-out device and generating system, but it should be understood that the drawing is illustrative and that the invention may be embodied in various other devices and systems.

Figure 1:
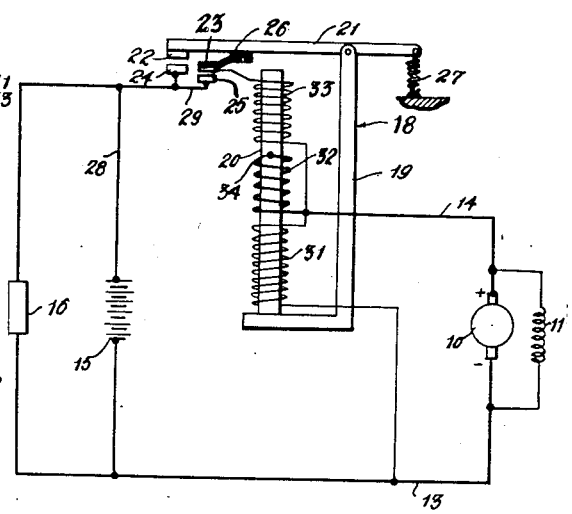

In the generating system illustrated in Fig. 1, I show a variable speed generator 10, which may be a shunt generator having a shunt field winding 11, and load conductors 13 and 14 connected with the generator brushes. In circuit with the generator I show a storage battery 15, and a load 16 which may be an air conditioning device or some other electrical apparatus to be operated.

Included in the generator-battery circuit I show an electromagnetic cut-out device 18 having a frame 19 carrying a single core 20 and an armature 21 pivoted on the frame for movement relative to the core. The armature 21 carries contacts 22 and 23 which cooperate respectively with stationary contacts 24 and 25. Cooperating contacts 22 and 24 may be herein referred to, at times, as the main contacts and cooperating contacts 24 and 25 may be herein referred to, at times, as auxiliary contacts. Contact 22 of the main contacts is electrically connected with the armature 21, and hence with the frame and core of the cut-out, but the contact 23 of the auxiliary contacts is insulated from the armature by the insulating body 26. A tension spring 27 acts on the armature 21 to resist closing of the pairs of contacts by the magnetic attraction of the core 20 on the armature and to cause opening of the pairs of contacts when the magnetic flux of the core weakens or dies out. The contact 24 of the main contacts is connected with one terminal of the battery 15 by means of the load conductor 28. The contact 25 of the auxiliary contacts is connected with the same terminal of the battery through the load conductor 28 and the conductor 29.

My novel cut-out relay also comprises magnet windings 31, 32 and 33, all of which are disposed around the single core 20 of the device. The coil 31 is a voltage or shunt coil which is energized directly from the generator 10, as by having its ends connected, respectively, with the load conductors 13 and 14.

The coil 32 is a series coil in the load circuit which may be referred to as the main series coil. One end of this coil is connected with the load conductor 14 and the other end is grounded on the cut-out device, for example, on the core 20 as indicated at 34, and is thus connected through the frame and armature of the cut-out with the movable contact 22 of the pair of main contacts.

The coil 33 is also a series coil but is formed of a larger number of turns of relatively finer wire and may be referred to as the auxiliary series coil.

One end of this coil is connected with the load conductor 14 and the other end is connected with the insulated contact 23 of the pair of auxiliary contacts. The coils 31 and 32 are wound on the core 20 so as to assist each other magnetically when both are energized from the generator, but the coil 33 is wound in a direction such that when it is energized from the battery 15 it will magnetically oppose the shunt coil 31.

From the construction of the cut-out device and the circuit connections as thus far described, it will be seen when the generator 10 is at rest the main and auxiliary contacts will be held open by the spring 27 and the storage battery 15 will then be disconnected from the generator. When the generator is started up, the shunt coil 31 is energized and when the magnetization of the core 20 is sufficient to overcome the spring 27 the armature 21 is attracted and auxiliary contacts 23 and 25 are closed. Since the speed of the generator is just building up, it is likely that the terminal voltage of the generator will be lower than the terminal voltage of the battery at the time that the contacts 23 and 25 close and, if such is the case, the auxiliary series coil 33 will be energized from the battery 15 and the flux produced by this coil will be in opposition to that produced by the shunt coil 31. The result is a decrease in the pull on the armature 21 which permits the spring 27 to open the contacts 23 and 25. The opening of these contacts causes de-energization of the auxiliary series coil 33 until the flux of the shunt coil 31 again builds up to a strength sufficient to attract the armature 21 and close the contacts 23 and 25.

It should be explained at this point that in constructing my improved cut-out device I arrange the auxiliary contacts 23 and 25 so that they will be closed by the armature in advance of the main contacts 22 and 24, and hence when the auxiliary series coil 33 is energized from the battery the flux acting on the armature is immediately weakened and the main contacts do not close. Hence it will be seen, that while the speed of the generator is building up and its terminal voltage is below the terminal voltage of the battery, the armature 21 is rapidly vibrated to cause the auxiliary contacts 23 and 25 to be rapidly closed and opened and that the frequency of the "make and break" at these contacts will gradually diminish as the generator voltage approaches the battery voltage.

As the terminal voltage of the generator approaches the terminal voltage of the battery, the current supplied to the auxiliary series coil 33 from the battery will decrease correspondingly. As the current flow in the coil 33 approaches zero it will be seen that the demagnetizing effect of this coil will also approach the zero value and the magnetic attraction of the coil 31 on the armature 21 will approach a maximum and the main contacts 22 and 24 will then be closed. The closing of the main contacts causes the main series coil 32 to be connected into the load circuit, and the increased magnetization of the core produced by this coil causes both the main and auxiliary contacts to be held closed as long as current is supplied from the generator through the load circuit. While the generator is operating with its terminal voltage above the terminal voltage of the battery, current will flow through the auxiliary series coil 33 in a direction to cause this coil to magnetically assist the voltage coil 31 and the main series coil 32 in holding the contacts of the cut-out closed.

Whenever the terminal voltage of the generator drops below the terminal voltage of the battery, such as would occur if the generator is slowed down or stopped, a reverse flow of current, that is, from the battery to the generator, will take place through the main series coil 32 and the demagnetizing effect thus produced on the core 20 quickly permits the armature 21 to be actuated by the spring 27 in a direction to open the main and auxiliary contacts. When the speed of the generator again builds up, the operation of the cut-out to reconnect the battery with the generator, as explained above, will be repeated.

Figure 2:
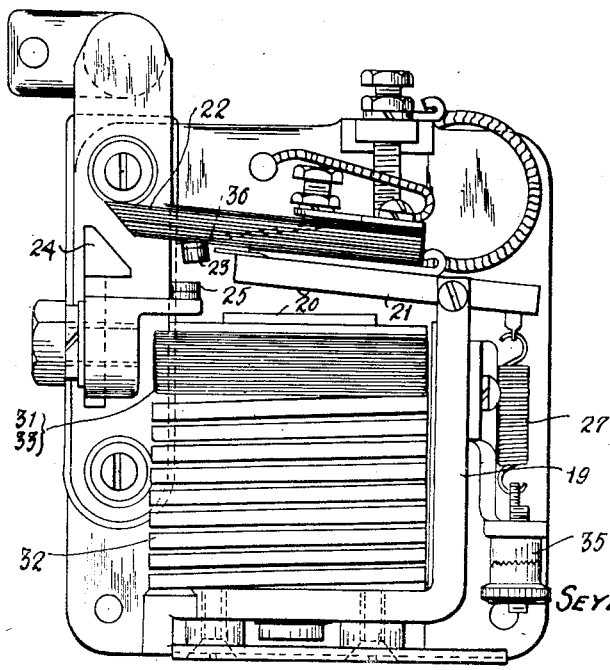
Fig. 2 is a front elevation of a cut-out relay embodying my invention.

In Figs. 2 and 3 of the drawing I show a practical form of construction for my novel cut-out device and the various parts of this device are designated by reference characters corresponding with those used in Fig. 1. In a practical embodiment of my cut-out device, as illustrated in Figs. 2 and 3, an adjustment 35 may be provided for the tension spring 27 and the contact 22 of the main pair of contacts may be of laminated form. Also, if desired, the closing of the auxiliary contacts 23 and 25 in advance of the main contacts may be secured by mounting the contact 23 on a resilient arm extension 36 of the armature 21 so that after the contact 23 engages the stationary contact 25 the armature may continue its movement a sufficient distance to bring the contact 22 in engagement with the contact 24.

From the foregoing description and the accompanying drawing, it will now be readily seen that I have provided a novel cut-out device and generating system in which the closing of the load circuit is automatically accomplished but the closing is made dependent upon the terminal voltage of the battery being below the terminal voltage of the generator. It will be seen furthermore that my cut-out relay is of very simple and inexpensive construction and that it is capable of rendering efficient and trouble-free service.

While I have illustrated and described my generating system and cut-out device in a somewhat detailed manner, it should be understood however that I do not wish to be limited to the precise circuit arrangements and details of construction herein disclosed, but regard my invention as including such changes and modifications as do not constitute a departure from the spirit of the invention and the scope of the appended claim.

Having thus described my invention, I claim:

In a system of the character described, a battery, a generator, a magnet frame having a core and an armature adapted to be vibrated in response to changes in the magnetization of the core and to be held when the magnetization increases to a predetermined value, a pair of main contacts adapted to be closed and opened by actuation of the armature, a pair of auxiliary contacts adapted to be closed and opened by the vibration of the armature with said auxiliary contacts closing in advance of the main contacts, a voltage coil on said core connected to be energized from the generator for causing closing of the pairs of contacts, a main coil on said core, a generator-battery circuit having said main coil and said main contacts in series therein, a second series coil on said core in parallel with the main series coil and controlled by said auxiliary contacts, said second series coil being wound to magnetically oppose the voltage coil when energized from the battery and to assist the voltage coil when energized from the generator.

SEYMOUR FLOYD STEWART.